Inventor
John M. Readey

UNITED STATES PATENT OFFICE.

JOHN M. READEY, OF ST. LOUIS, MISSOURI.

AIR-BRAKE APPARATUS.

1,391,404.  Specification of Letters Patent.  Patented Sept. 20, 1921.

Application filed July 19, 1920. Serial No. 397,281.

*To all whom it may concern:*

Be it known that I, JOHN M. READEY, a citizen of the United States, residing at St. Louis, Missouri, have invented a certain new and useful Improvement in Air-Brake Apparatus, of which the following is a full, clear, and exact description, such as will enable others skilled in the art to which it appertains to make and use the same, reference being had to the accompanying drawings, forming part of this specification.

My invention relates generally to air brake apparatus and more particularly to automatically operating means for effecting a saving of a substantial portion of the compressed air that is ordinarily discharged from the brake cylinder to the atmosphere upon the release of the brakes.

My invention as herein disclosed is particularly intended for use in connection with air brake apparatus which permits a certain amount of air pressure to escape to atmosphere from the brake cylinders upon the release of the brakes rather than to those systems whereby the release of the brakes is effected through a reduction of pressure in certain parts of the system and which reduction of pressure does not involve the loss or escape of any appreciable amount of fluid pressure from the system.

The principal object of my invention is to combine with an air brake apparatus and particularly the type of apparatus now generally used upon street and interurban railways, a valve device that operates under certain conditions in connection with the engineer's valve and which will be effective in delivering to a suitable tank or container the compressed air that is ordinarily exhausted to atmosphere upon the release of the car brakes, and the compressed air thus saved delivered to the reservoir being available for use in the operation of some mechanism associated with the car, for instance, the car door opening and closing mechanism.

Further objects of my invention are, to provide a relatively simple and efficient valve device that is entirely automatic in action and which can be readily installed in air brake systems now in general use.

With the foregoing and other objects in view, my invention consists in certain novel features of construction and arrangement of parts, hereinafter more fully described and claimed, and illustrated in the accompanying drawings, in which—

Figure 1:
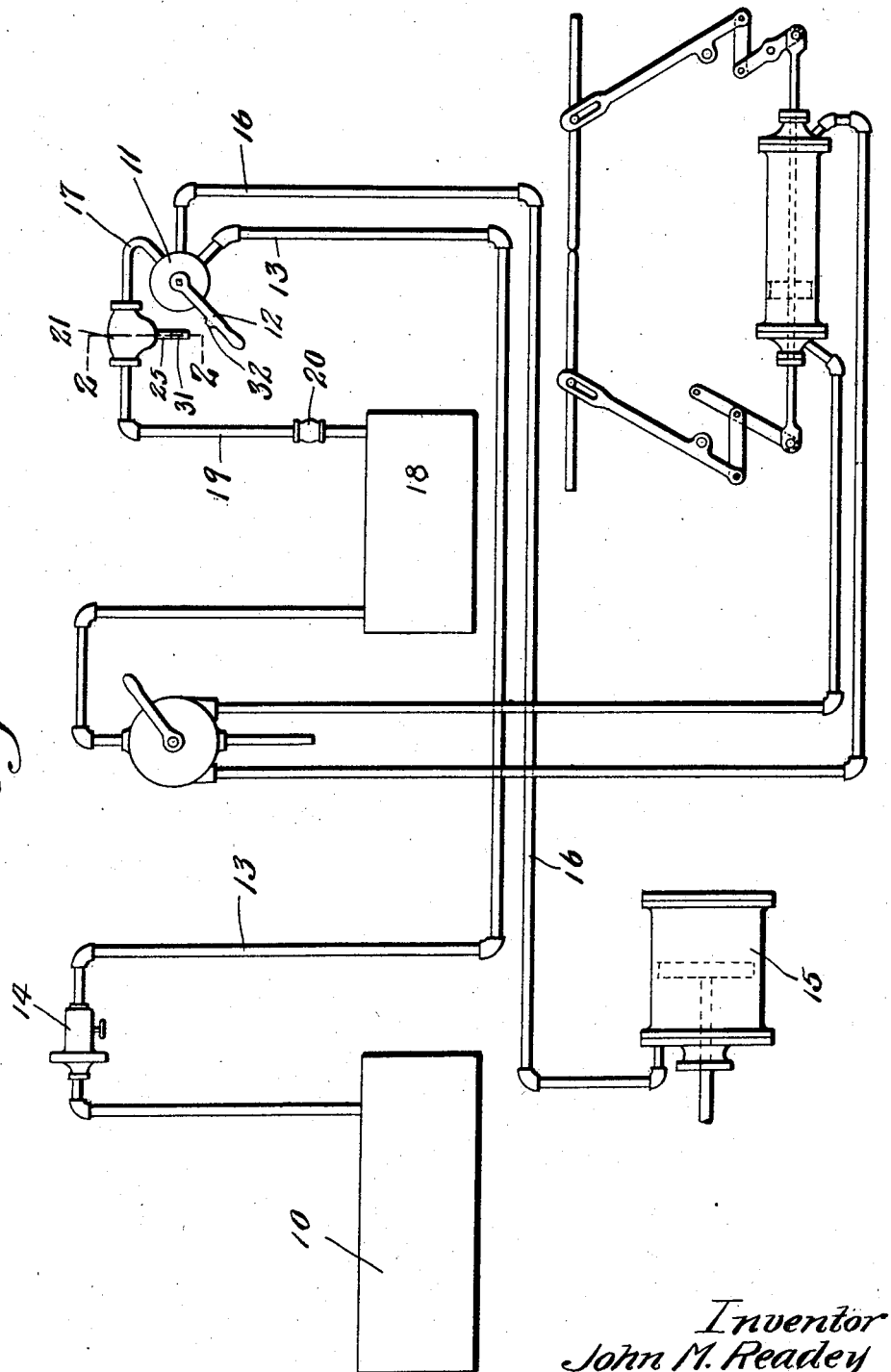
Figure 1 is a diagrammatic view of a well-known form of air brake apparatus and with which my improved valve device is associated.

Referring by numerals to the accompanying drawings, which illustrate a practical embodiment of my invention, 10 designates the main compressed air tank or reservoir of an air brake apparatus, 11 the usual form of engineer's valve, the operation of which is controlled by the usual handle 12 and leading from reservoir 10 to the inlet port of the engineer's valve is a compressed air supply pipe 13 in which is located a suitable regulating valve 14. Leading from the engineer's valve 11 to the brake cylinder 15 is a compressed air supply pipe 16 and leading from the exhaust port of the engineer's valve is an exhaust pipe 17 which, under ordinary conditions, is open to the atmosphere.

The parts just described are well known in the art and in themselves form no part of my invention.

Located at a convenient point on the car is a tank or receptacle 18 that is adapted to receive air that is exhausted from the system in the usual manner upon the actuation of the engineer's valve to release the brakes and leading from the exhaust pipe 17 to this tank or reservoir is a pipe 19 in which is located a suitable check valve 20.

The pressure of the air taken into reservoir 18 can be utilized as desired, but in the accompanying drawing I have shown connections and devices whereby this pressure can be used for the operation of the car door opening and closing mechanism.

Located in pipe 19 and preferably at a point to the side of and immediately adjacent to the engineer's valve 11 is a valve housing 21 from which projects laterally a short tubular member 22 through the wall of which is formed an exhaust port 23. Closing the outer end of the tubular member 23 is a screw plug 24 and arranged to slide therethrough is a stem 25, the inner end of which carries a valve 26 that normally rests upon seat 27, which latter is formed at the inner end of tubular member 22. Arranged on stem 25 at a suitable point beyond plug 24 is a collar 28 and disposed between this collar and the end of the plug 24 is a relatively light expansive coil spring 29, the same tending to normally maintain valve 26 upon its seat. Connected by a hinge joint 30, the axis of which is horizontally disposed, to the outer end of stem 25 is a vertically swinging block 31 which, when shifted into a horizontal position by means hereinafter described, lies in direct alinement with the axis of stem 25 and directly in the path of travel of a pin or lug 32 that projects laterally from the adjacent side of the handle 12 of the engineer's valve.

Leading from the valve casing 21 downwardly and laterally is a pipe 33, and connected thereto is a vertically disposed valve housing 34 that is positioned immediately beneath the outer portion of stem 25 and the block 31 carried thereby. The upper end of this valve housing 34 is closed by a cap or screw plug 35 in which is seated a tubular nut 36 and passing through the latter is a stem 37. The upper end of this stem carries an anti-friction roller 38 that normally bears against the underside of block 31.

Carried by the lower end of the stem 37 and arranged to reciprocate within valve housing 34 is a disk valve 39 and arranged upon the stem and interposed between this valve and the lower end of tubular nut 36 is an expansive coil spring 37ª. By proper manipulation of the nut 36, the tension of this spring can be regulated.

Figure 3:
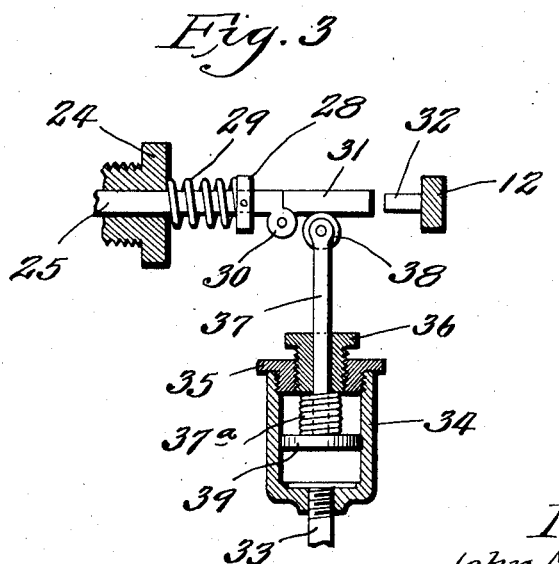
Fig. 3 is an enlarged detail section illustrating the construction of a detent for the exhaust valve.

The operation of my improved device is as follows:

As long as there is a predetermined degree of pressure in tank 18 or sufficient pressure to operate the door opening and closing mechanism, and which latter, it will be understood, can be operated with relatively low air pressures, the pressure within tank 18, pipe 19, valve 21, and pipe 33 will be exerted against the underside of disk valve 39 to hold the same and parts carried thereby elevated or in the position illustrated in Fig. 3, and while this condition exists, the block 31 is in direct alinement with the axis of valve stem 25 and said block also lies in the path of travel of the lug 32.

It will be understood that in the operation of the engineer's valve, the handle 12 is shifted toward the lefthand to permit the exhaust of fluid pressure from the brake cylinder through exhaust pipes 15 and 17 when the brakes are released and when the handle 12 is thus moved to effect a release of the brakes, the lug 32 will engage the outer end of block 31 and move the latter and stem 25 and valve 26 inwardly so as to unseat said valve and permit the fluid pressure to exhaust from pipe 17 through housing 21 past open valve 26 and from thence to atmosphere through port 23, and it will be understood that this exhaust of fluid pressure to atmosphere takes place as long as there is sufficient pressure in tank 18 to actuate the door opening mechanism or other mechanical device that is actuated by the exhaust fluid pressure.

Figure 2:
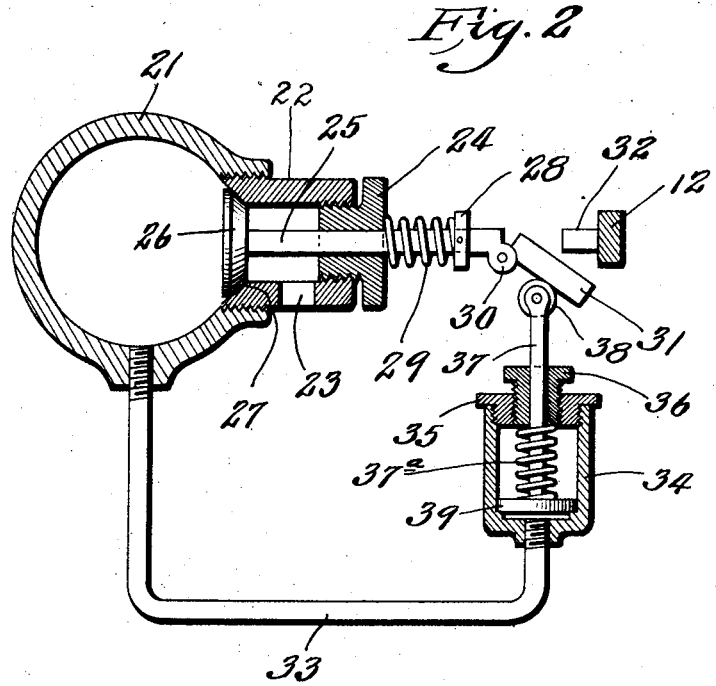
Fig. 2 is an enlarged cross section taken approximately on the line 2—2 of Fig. 1.

When the fluid pressure within the tank 18 drops below a predetermined degree or approaches a degree which is insufficient to actuate the door opening mechanism or other mechanical device, spring 37ª will, as a result of the reduction of pressure against the underside of disk valve 39 move said valve downward in cylinder 34, thereby lowering anti-friction roller 38 and following this action, block 31 will swing downward into the position illustrated in Fig. 2 so that its outer portion is below the path of travel of the lug 32 and with the parts so positioned, the handle 12 when swung to its limit of movement toward the lefthand will not actuate or open valve 26 and as a result the air pressure that is exhausted from the system upon the release of the brakes will pass from exhaust pipe 17 through valve housing 21 and through the pipe 19 past check valve 20 to the exhaust fluid pressure tank 18, thereby building up the pressure in said tank to a predetermined degree or somewhat in excess of the degree required to effect an actuation of the door operating mechanism.

When the pressure has been thus built up in tank 18, disk valve 39 will be forced upward against the resistance offered by spring 37ª and the roller 38 will move block 31 upward into a substantially horizontal position and directly in the path of travel of the lug 32 on handle 12.

Thus by my improved apparatus, the fluid pressure that is usually exhausted or discharged to atmosphere upon the release of the brakes is delivered to a suitable tank or container from whence it can be utilized as desired.

The valve device which controls the discharge of fluid pressure to atmosphere or to the storage tank is relatively simple, can be readily combined with air brake systems now in general use, and is practically automatic in its action.

It will be readily understood that minor changes in the size, form and construction of the various parts of my improved apparatus can be made and substituted for those herein shown and described, without departing from the spirit of my invention, the scope of which is set forth in the appended claims.

I claim as my invention:

1. The combination with an air brake apparatus including an engineer's valve, of a container connected to the exhaust port of said engineer's valve, a valve for controlling the passage of exhaust fluid pressure from the engineer's valve to said container which valve is adapted to be opened by movement of the handle of the engineer's valve to permit the exhaust of fluid pressure to atmosphere and means under control of the pressure within the container for controlling the operation of said valve.

2. The combination with an air brake apparatus having an engineer's valve, of a fluid pressure receptacle, a pipe leading from the exhaust port of the engineer's valve to said receptacle, a valve located in said pipe adjacent to said engineer's valve and adapted to be opened by movement of the handle of said engineer's valve to permit the exhaust of fluid pressure from said engineer's valve to atmosphere and means under control of the pressure within the container for controlling the operation of said valve.

3. The combination with an air brake apparatus having an engineer's valve, of a fluid pressure receptacle, a pipe leading from the exhaust port of the engineer's valve to said receptacle, a valve in said pipe, and a valve unseating member that is adapted to be moved into the path of travel of the handle of the engineer's valve by a predetermined degree of pressure within said receptacle.

4. The combination with an air brake apparatus having an engineer's valve, of a fluid pressure receptacle, a pipe leading from the exhaust port of the engineer's valve to said receptacle, a valve located in said pipe, and a gravity member associated with the stem of said valve, which gravity member is adapted to be moved into the path of travel of the handle of the engineer's valve by a predetermined degree of pressure in the receptacle.

5. The combination with an air brake apparatus having an engineer's valve, of a fluid pressure receptacle, a pipe leading from the exhaust port of the engineer's valve to said receptacle, a valve located in said pipe, said valve having a part that is adapted to be engaged by the handle of the engineer's valve, and means under control of the pressure within said receptacle for preventing the operation of said valve by movement of the handle of said engineer's valve.

6. The combination with an air brake apparatus having an engineer's valve, of a fluid pressure receptacle, a pipe leading from the exhaust port of the engineer's valve to said receptacle, a valve located in said pipe and adapted to be opened by movement of the handle of the engineer's valve to permit exhaust of fluid pressure from said engineer's valve to atmosphere, and means controlled by the pressure within said receptacle for rendering said valve inoperative.

7. The combination with an air brake apparatus having an engineer's valve, of a fluid pressure receptacle, a pipe leading from the exhaust port of the engineer's valve to said receptacle, a valve located in said pipe, said valve being provided with a normally closed exhaust port, which valve is adapted to be opened by the handle of the engineer's valve when the same is moved to exhaust position to open the exhaust port in said valve and means under control of the pressure within the container for controlling the operation of said valve.

8. The combination with an air brake apparatus having an engineer's valve, of a fluid pressure receptacle, a pipe leading from the exhaust port of the engineer's valve to said receptacle, a valve located in said pipe, said valve being provided with a normally closed exhaust port, which valve is adapted to be opened by the handle of the engineer's valve when the same is moved to exhaust position to open the exhaust port in said valve, and means under control of the pressure in the receptacle for preventing operation of said valve by movement of the handle of the engineer's valve.

In testimony whereof I hereunto affix my signature this 14th day of July, 1920.

JOHN M. READEY.